June 9, 1964 J. I. DASPIT 3,136,994

VIDEO DATA ENCODING CIRCUIT

Filed June 19, 1956 7 Sheets-Sheet 1

JOHN IGNATIUS DASPIT
INVENTOR.

BY Edward V. Kendrick

ATTORNEY

JOHN IGNATIUS DASPIT
INVENTOR.

BY [signature]
ATTORNEY

June 9, 1964 J. I. DASPIT 3,136,994

VIDEO DATA ENCODING CIRCUIT

Filed June 19, 1956 7 Sheets-Sheet 3

JOHN IGNATIUS DASPIT
INVENTOR.

BY [signature]

ATTORNEY

June 9, 1964 J. I. DASPIT 3,136,994

VIDEO DATA ENCODING CIRCUIT

Filed June 19, 1956 7 Sheets-Sheet 4

JOHN IGNATIUS DASPIT
INVENTOR.

BY [signature]

ATTORNEY

JOHN IGNATIUS DASPIT
INVENTOR.

BY [signature]

ATTORNEY

June 9, 1964 J. I. DASPIT 3,136,994

VIDEO DATA ENCODING CIRCUIT

Filed June 19, 1956 7 Sheets-Sheet 6

JOHN IGNATIUS DASPIT
INVENTOR.

BY Elmwood Kendrick

ATTORNEY

June 9, 1964 J. I. DASPIT 3,136,994

VIDEO DATA ENCODING CIRCUIT

Filed June 19, 1956 7 Sheets-Sheet 7

JOHN IGNATIUS DASPIT
INVENTOR.

BY Elwood McKendrick
ATTORNEY 3,136,994

VIDEO DATA ENCODING CIRCUIT

John I. Daspit, Santa Monica, Calif., assignor to Gilfillan Corporation, a corporation of California Filed June 19, 1956, Ser. No. 593,016
4 Claims. (Cl. 343—17.1)

This invention relates to a video data encoding circuit and method allowing bandwidth compression and, more particularly, to a circuit and method for encoding remote video data in a manner allowing transmission thereof over narrow bandwidth facilities such as telephone lines to a central station; the circuit and method having the further particular feature that no electronic or mechanical synchronism is required between the means providing the remote video data and the encoding circuit.

The present invention forms an important subcombinational part of the system described and claimed in U.S. patent application Serial No. 593,011 for "System and Method for Remote Radar Data Transmission and Coordinated Assembly at a Central Station" by E. J. Barlow et al. filed June 15, 1956, now U.S. Patent No. 2,972,141 issued February 14, 1961. In this copending application a method is introduced for remote data transmission to a central station and transformation there into video data in the coordinates of the central station. An efficient solution to the data assembly problem inherent in such a situation is provided. The encoder of the present invention finds particular application in the system of this copending application in providing means for "compressing" the video data so that it is suitable for transmission via narrow band facilities.

It will be understood, however, that the encoding circuit and method provided by the present invention are not necessarily limited to utilization in a system of the type described in the copending application. The technique introduced herein may have a multitude of other applications which may arise in any situation where data existing in a broad frequency band must be "compressed" for a subsequent utilization.

In another attempt which has been made to solve the data compression problem, the video data to be compressed in effectively regenerated and synchronously scanned at a lower rate. This technique allows compression by presenting the video data a number of times to ensure that a synchronized scanning signal coincides with at least part of the video data which is regenerated.

In a particular mechanization the regenerating technique of the prior art is accomplished by visually displaying the video data on an intensity modulated circular "J" display, the cycle rate for the intensity "J" display being synchronized in accordance with the scanning signals required for obtaining the video data. Thus in a particular situation the circular "J" sweep is synchronized with radar trigger signals so that each circular sweep is initiated at a predetermined point on the display upon occurrence of a trigger signal.

The "J" display obtained in this manner then is scanned in synchronism with the trigger signals but at lower rate which is selected according to the range resolution required and the bandwidth of the transmission facilities available.

Not only is it necessary to accurately synchronize the "J" display control signals and the scanning control signals but it is also necessary to generate the required azimuth synchronizing signals separately and to then mix these synchronizing signals with the video data after it has been compressed. It should be apparent then that this technique necessitates a complexity of electronic circuits for synchronization, for separately generating synchronizing or reference signals, and for mixing these signals with the compressed video data signals.

The present invention obviates these and other disadvantages inherent in prior art approaches by providing a method and a circuit for compressing video data where a storage device is utilized to retain the video data information for a period corresponding to an antenna scanning cycle during which the stored data is read to provide compressed data suitable for transmission via narrow bandwidth facilities. The memory characteristic or decay time of the storage device is selected so that it is equal to or greater than a scanning cycle, thereby allowing the scanning to be performed at a rate which is independent of the rate of scanning utilized to provide the video data signals. This then obviates the necessity of complicated synchronizing circuits which would otherwise be required to ensure that the scanning rate for compression was accurately tied to the scanning rate for video data signal generating.

Another feature provided by the storage and asynchronous scanning techniques of the present invention is that all reference and synchronizing signals which may be needed for subsequent decoding or display may be entered into appropriate positions in the memory device utilized. Thus the scanning device not only detects the compressed video data but also automatically inserts the required synchronizing and reference signals. This has the further advantage in that variations in the scanning rate during a cycle will introduce a corresponding variation in the reference signal rate so that it is not necessary to regulate the scanning rate as accurately as is otherwise required.

In addition to providing a new approach to the video data compression problem which constitutes an important step forward in the art, the invention also provides a specific circuit arrangement wherein the basic principles discussed above are embodied in a most economical and efficient manner. Thus in the particular mechanization which is described in detail hereinafter, the video data to be compressed is first translated into a visual display which may be presented through the medium of a cathode ray tube. In the preferred practice of the invention this display is based upon rectangular coordinates allowing the simplest arrangement of display control circuits.

The visual display provided is then optically coupled to a scanning device, which preferably is a Vidicon camera tube. If the rectangular display is utilized, according to the preferred practice of the invention, the scanning device is also actuated in a simple manner with rectangular deflection coordinates to read out the visual information available on the display device. While the storage characteristic required may exist in the visual display device, in the storage device, or in both, it has been found convenient in the practice of the invention to utilize the storage characteristic of a Vidicon tube rather than to rely upon specially designed display devices such as the Graphicon more specifically referenced below.

In this particular mechanization of the invention, it has been found that the Vidicon camera provides the required storage characteristic, if the accelerating potentials selected are lower than those utilized in conventional TV camera practice. The technique of lowering the potential lengthens the decay time of the storage characteristic and may allow storage time intervals exceeding 20 seconds.

Where the visual display storage technique is utilized, the desired reference and synchronizing signals which are to be transmitted along with the compressed video data are visually displayed in the proper reference position. Thus, in a particular application of the invention which is described, remote radar trigger and azimuth-gated range-marking signals are displayed. In this manner the scanning device automatically generates azimuth-gated range-marking signals and trigger signals at its own rate of scanning, thereby obviating the necessity of the separate generation and insertion of synchronizing signals. These reference signals then are readily decoded at a central station in the manner described in the above-mentioned co-pending application.

Accordingly, it is an object of the present invention to provide an encoding circuit for compressing the bandwidth of video data signals, without requiring complicated circuits for synchronizing the encoding circuit with the video data signal providing means.

Another object of the invention is to provide a method of signal bandwith compression which does not require that the video signals to be compressed be scanned at the same rate they are generated.

A further object is to provide means for preparing signals existing in a broad frequency band for transmission via narrow frequency band facilities, the means including a storage device which allows asynchronous operation and the automatic generation of reference signals without additional circuits.

Still another object is to provide a method for preparing video data for transmission through narrow band facilities where the video data is stored and scanned asynchronously, the storage step retaining the video data for a period equal to or greater than the interval of a scanning cycle.

A more specific object is to provide a system for video data transmission through narrow band facilities where the data is first translated to a visual display and then is scanned at a rate corresponding to the resolution desired and the frequency bandwidth available, either the visual display means or the scanning means providing a storage function corresponding to the scanning cycle.

Another specific object of the invention is to provide an encoding circuit for compressing the bandwidth of video data signals without requiring complicated circuits for synchronization, where the video data is first translated to a visual display on a cathode ray tube and is then scanned asynchronously by means of a Vidicon camera and storage tube.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 1:
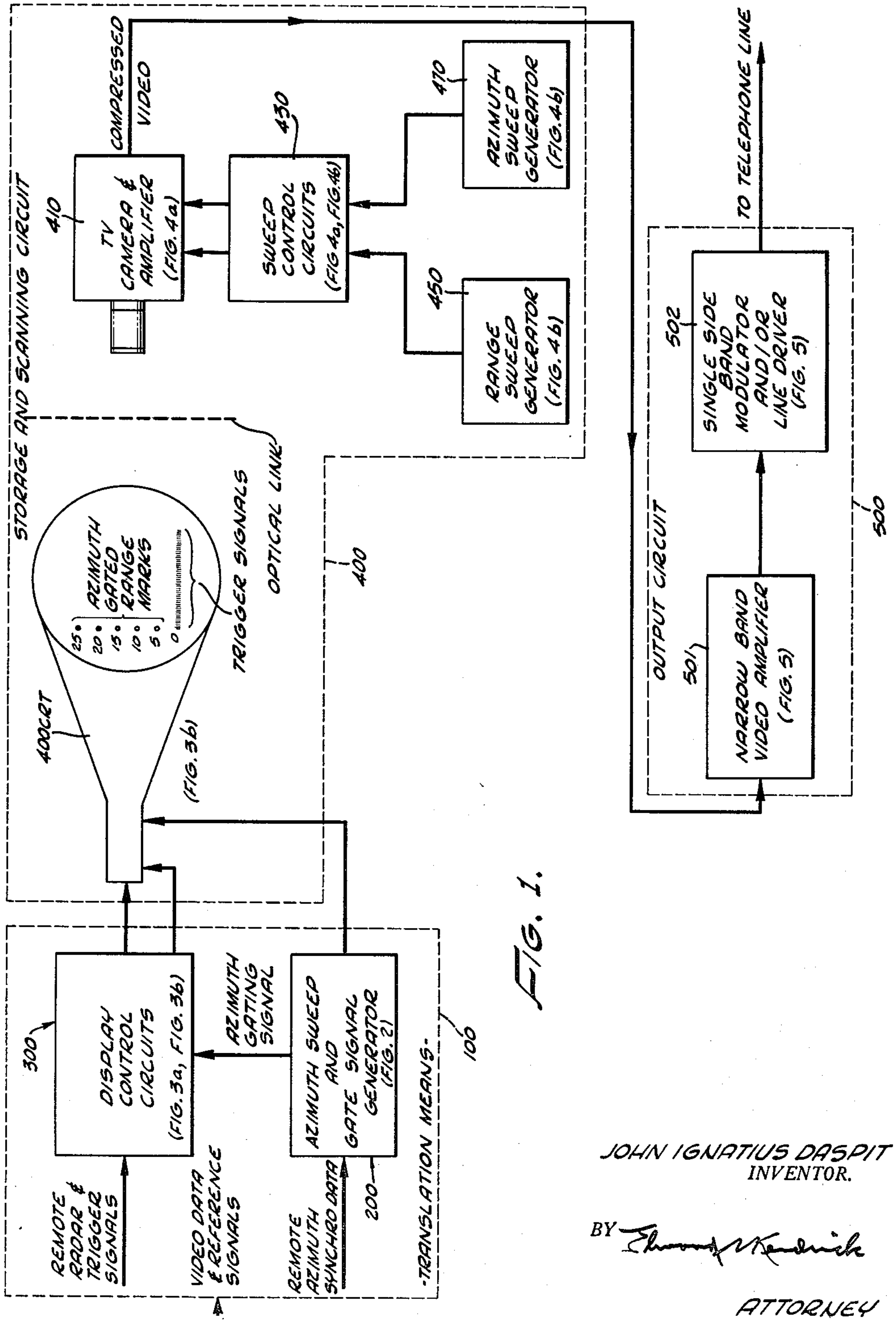
FIG. 1 is a block diagram illustrating the general form of a video data encoding circuit according to the present invention.
Figure 3A:
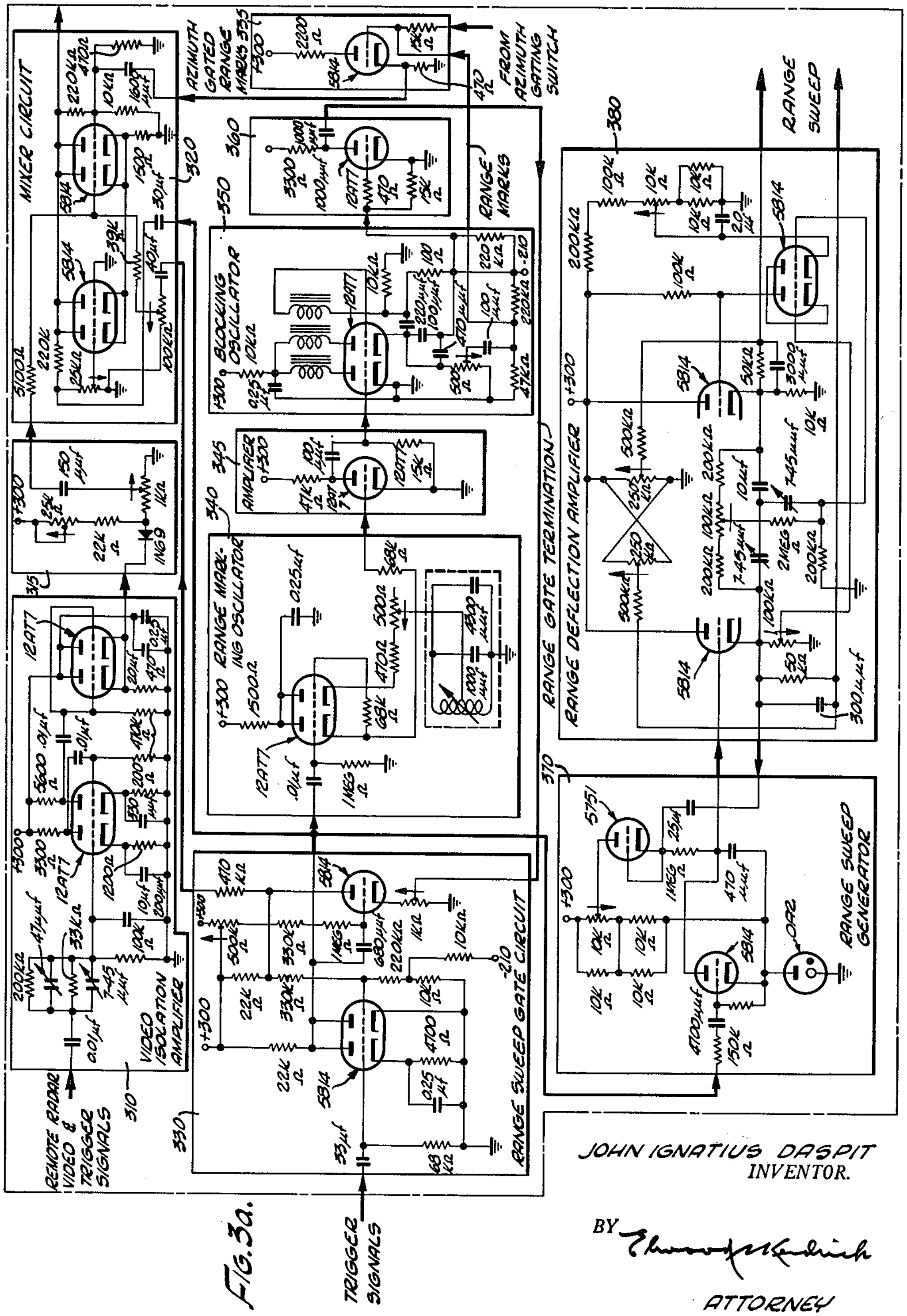
Figure 3B:
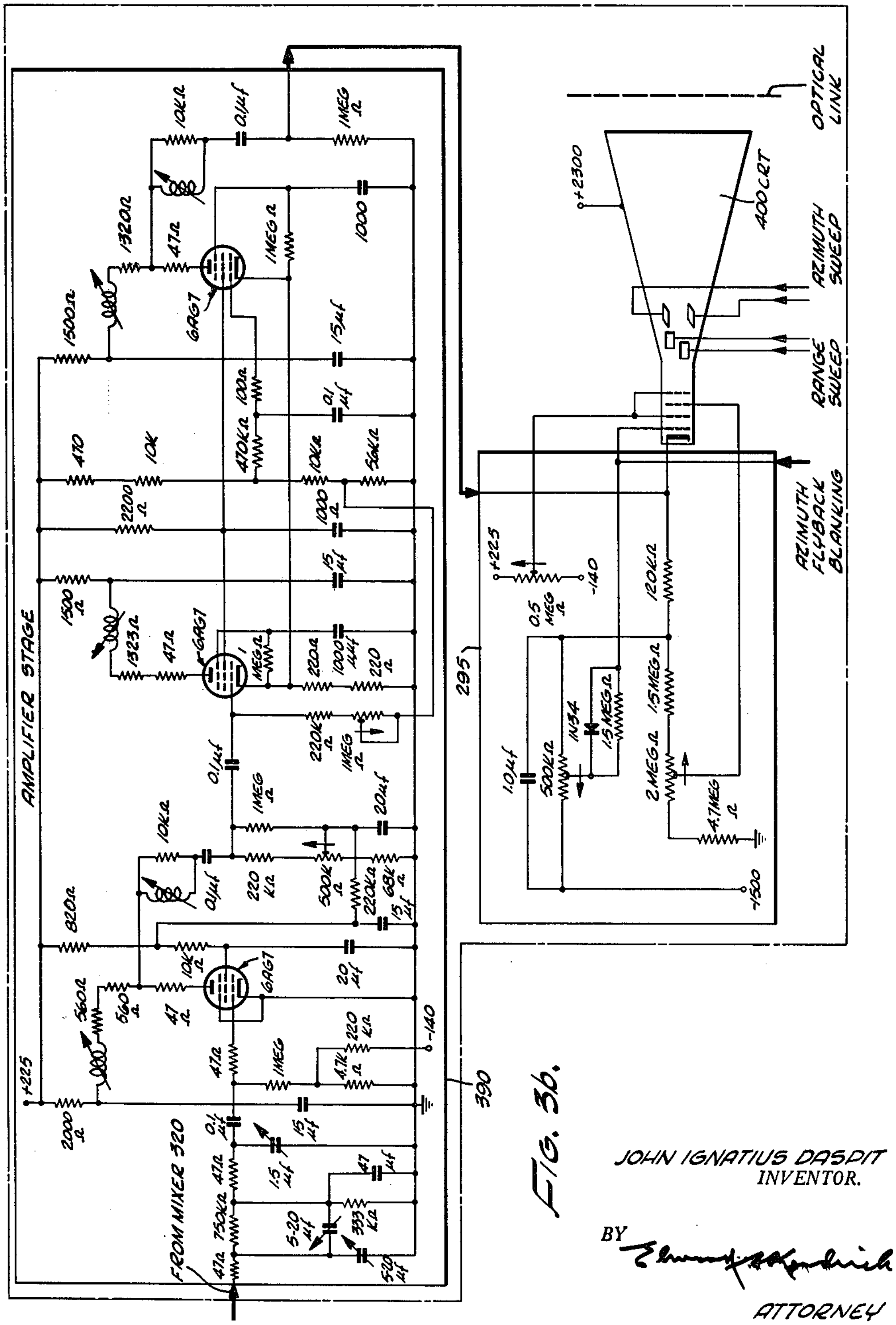
Figure 4A:
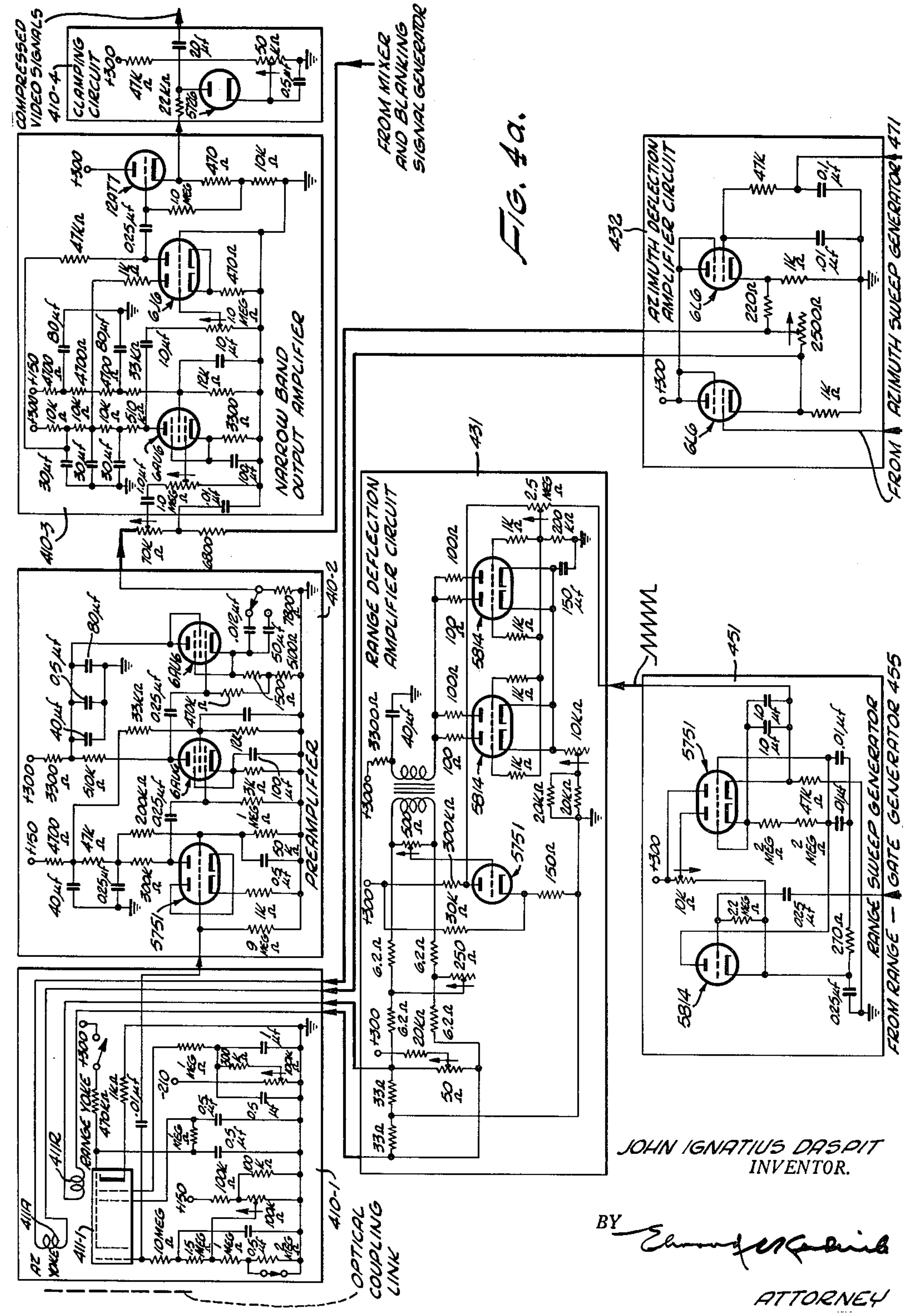
Figure 4B:
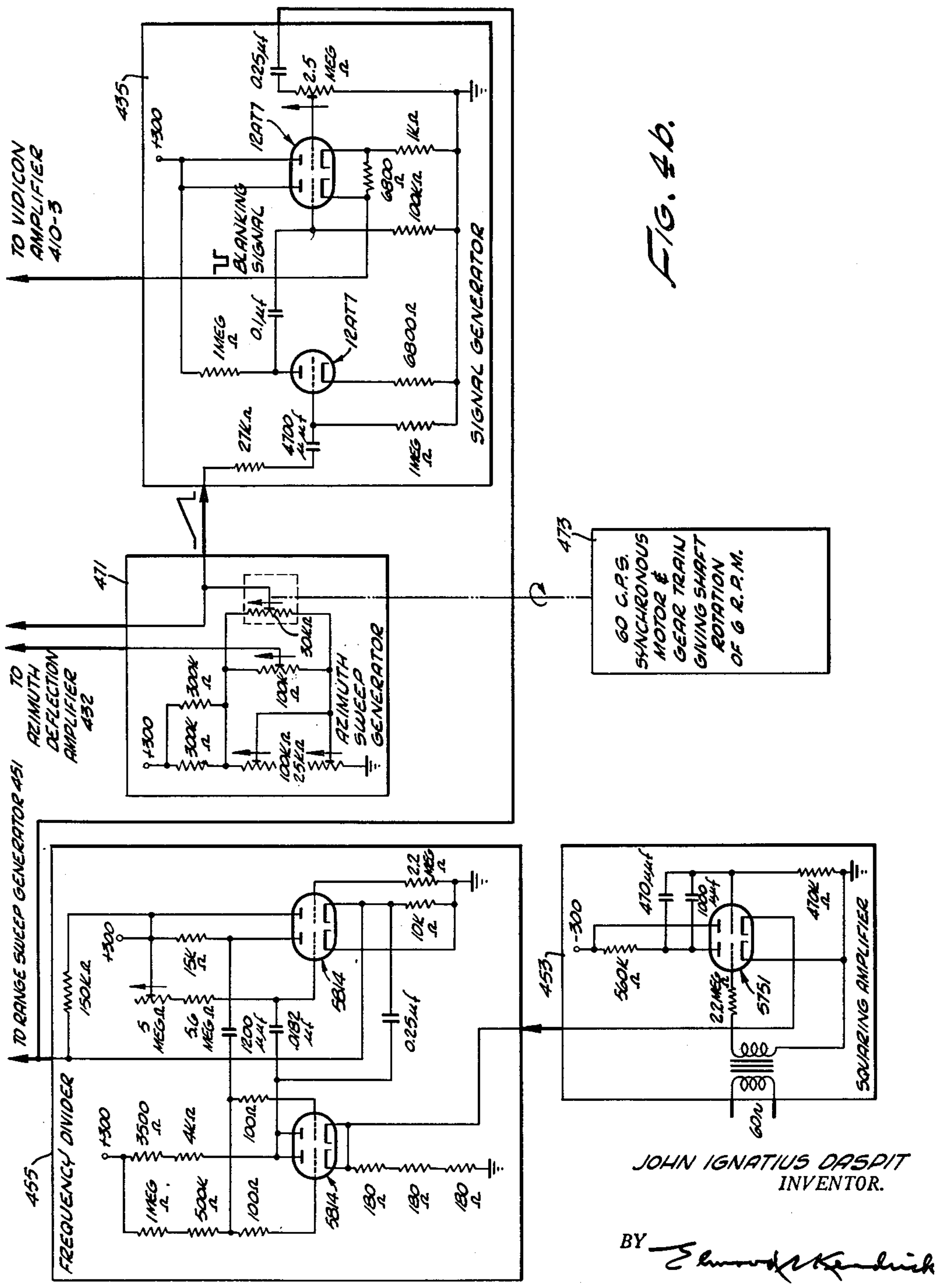
Figure 5:
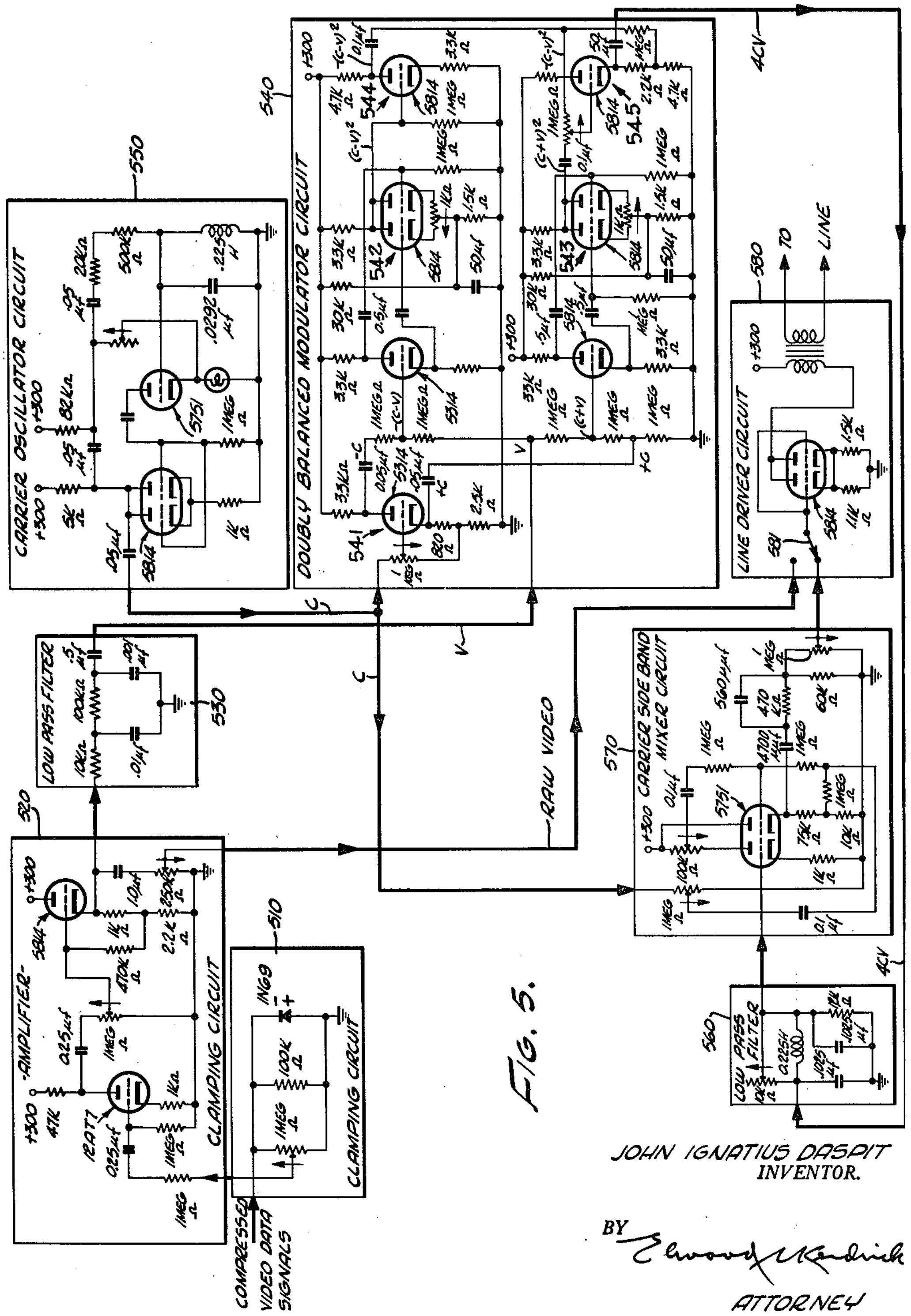

FIGS. 3*a* and 3*b* constitute a schematic diagram of a suitable form for display control circuits 300 forming part of translation circuit 400 in the embodiment of FIG. 1, the circuits being also arranged in a block diagram form to indicate the basic components;

FIGS. 4*a* and 4*b* constitute a schematic diagram illustrating a suitable form for the circuits included in scanning means 400 of the embodiment of FIG. 1, the block diagram arrangement being again utilized to indicate basic components; and FIG. 5 is a schematic diagram of suitable form of the output circuit 500 forming part of the embodiment of FIG. 1, a block diagram component arrangement also being employed.

Reference is now made to FIG. 1 where the general form of encoding circuit allowing bandwidth compression, according to the present invention, is shown in block diagram form. As indicated in FIG. 1, video data and reference signals to be encoded are applied to translation means 100 which is operative to prepare the applied signals for storage, as will be more fully explained below. In order to illustrate a particular form which translation means 100 may assume, two subcomponent circuits 200 and 300 are shown which are particularly designed for the encoding of the remote radar and trigger signals and remote azimuth synchro data. Thus circuit 200 is indicated to be an azimuth sweep and gate signal generator and circuit 300 is indicated to include display control circuits which drive a cathode ray tube device 400CRT, forming part of circuit 400 described below.

Display device 400CRT is merely illustrative of one means which may form part of a storage and scanning circuit 400, the function of which is to translate input signals prepared by circuit 100 into corresponding compressed video data signals which may be transmitted through narrow band facilities.

In a particular form means 400 is indicated to include cathode ray tube device 400CRT and a TV camera and amplifier circuit 410, which may include a Vidicon tube, as is more specifically pointed out below. In order to illustrate a specific utilization of the invention, as in the case of translating means 100, means 400 is indicated to include sweep control circuits 430 for actuating camera 410 to scan the display provided by device 400CRT optically linked thereto through appropriate means not shown. Means 400 is also indicated as including a range sweep generator 450 and an azimuth sweep generator 470 for controlling the corresponding operation of circuit 430 in a particular application where radar video data is to be compressed for transmission.

Circuit 400 then provides compressed video output signals which are applied to an output circuit 500 suitable for driving narrow band transmission facilities such as a telephone line. As indicated circuit 500 may include a narrow band video amplifier stage 501 coupled to a single side band modulator and/or line driver circuit 502; another arrangement being shown in FIG. 5.

It is important in mechanizing means 400 that a storage device be included allowing the asynchronous operation of the scanning circuits with respect to the time of occurrence of the reference signals forming part of video data received by circuit 100. Thus the invention may be practiced by utilizing a storage tube to provide the visual display of the translated signals provided by circuit 100. For example, cathode ray tube 400CRT may be a Metrechon such as is described on pages 145–162 of an article entitled "The Metrechon—a Half-Tone Picture Storage Tube" by L. Pensak published in the RCA Review, volume 15, 1954.

Moreover, a double beam storage tube may be utilized where no visual display is required, the desired stored video data signal being available as semiconductive charges on a storage surface. In this situation it may be considered that cathode ray tube 400CRT and TV camera 410 are integral parts of a single unit such as a Graphicon, a suitable form of which is described on pages 230–250 of an article entitled "Graphicon Writing Characteristics" by A. H. Benner et al. published in RCA Review, volume 12, June 1951.

However, it has been found convenient in the practice of the invention to utilize a Vidicon camera tube in combination with a conventional cathode ray tube display device to provide the desired scanning and storage operation. The characteristics of the Vidicon tube and associated circuits will be considered in further detail below.

However, it will be understood that fundamentally other storage media may be employed such as magnetic tape or drum.

Another important thing to be noted in FIG. 1 is that according to the preferred practice of the invention any reference signal which is to be transmitted through the narrow band facilities is entered along with the video data to be compressed into the storage device so that this information may be scanned along with the video data. Thus in the particular arrangement indicated in circuit 400 cathode ray tube 400CRT is indicated as being actuated to display azimuth-gated range marks and trigger signals. Thus camera 410 may be utilized to scan the display provided and automatically generates appropriate reference or synchronizing signals which are properly positioned in time in relation to the video data displayed. It will be understood, of course, that the visual display of reference marks is not required since these marks may as well be stored as a charge pattern or a series of magnetic spots.

The method of the invention will be better understood when specific circuit arrangements are considered, reference being made to FIGS. 2, 3*a*, 3*b*, 4*a*, 4*b* and 5. In these figures specific circuit mechanizations are indicated and suitable circuit parameters are designated, the convention assumed throughout being that all resistors are specified in ohms, all capacitors in micromicrofarads, and all inductors in microhenrys unless otherwise specified.

While the specific arrangements shown in the figures are designed for a radar video data encoding application, it will be understood that many of the techniques employed may be utilized in general application. Thus the range and azimuth sweep circuits shown in FIG. 2 may be similar to vertical and horizontal deflection circuits where the video data forms part of a conventional TV raster.

Figure 2:
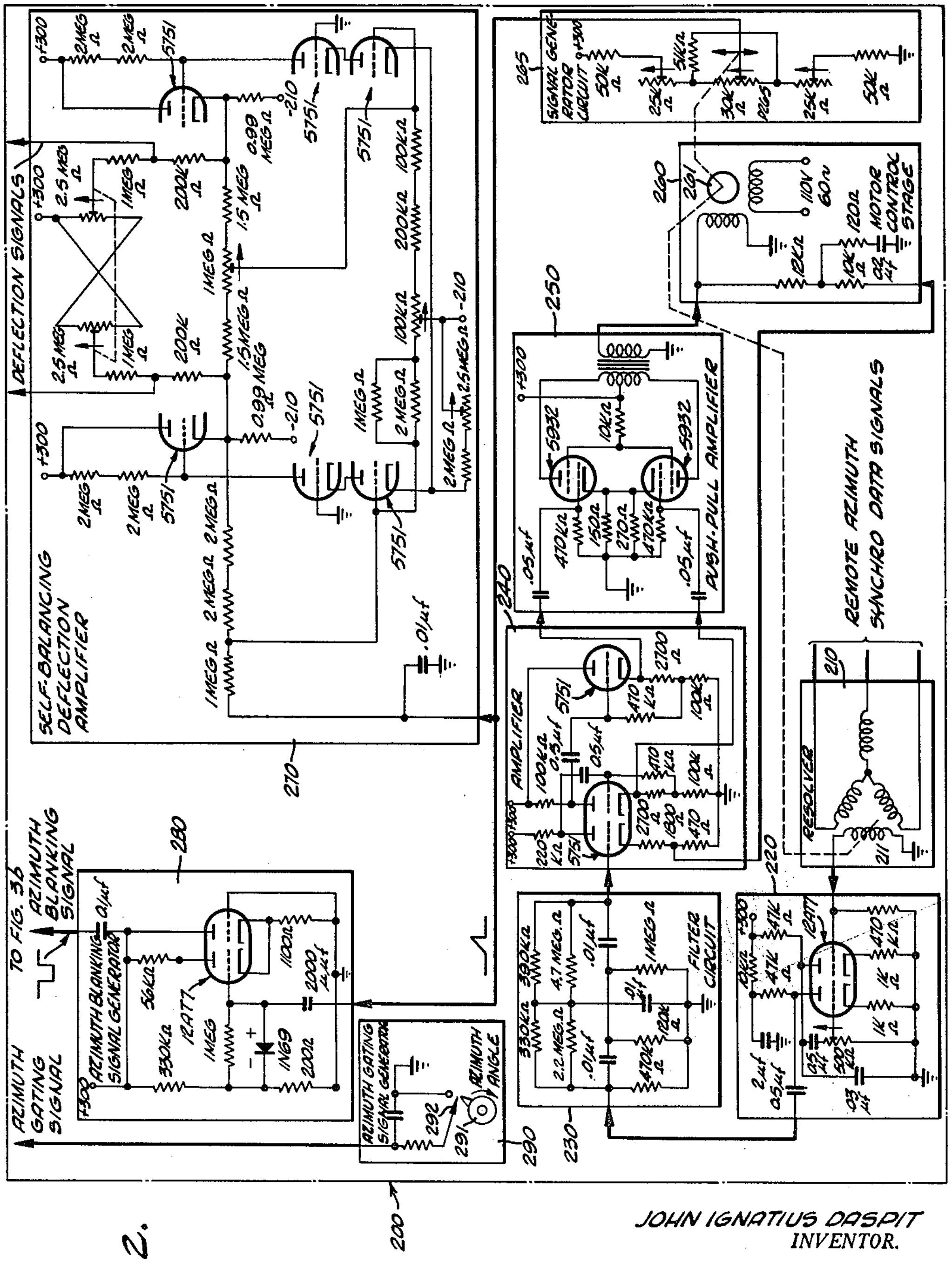
FIG. 2 is a schematic diagram of one form of azimuth sweep and gate signal generator which may be utilized in translation circuit 100 of the embodiment of FIG. 1; the circuits of FIG. 2 being arranged into block groups corresponding to the basic components utilized.

Referring now to FIG. 2, it is noted that remote azimuth synchro data signals are received by a resolver 210 having its rotor winding 211 coupled to an amplifier stage 220. The output signal produced by stage 220 is applied to a filter circuit 230 designed to provide a null response at the static frequency of resolver 210 which may be 60 cycles in a particular application.

The signal produced by circuit 230 then is effectively an error derivative signal which is amplified and split into two phases in a stage 240 and applied to a push-pull amplifier 250. Amplifier 250 is transformer coupled to one of the input windings of a motor control stage 260. Control stage 260, it will be noted, includes a motor 261 which is rotated until the frequency difference signal derived through stages 230, 240 and 250 becomes zero. The feedback loop required to achieve the required servo operation is effected by coupling motor 261 mechanically to the rotor 211 of resolver 210. Thus in this manner motor 261 is actuated to rotate in angular position under the control of remote azimuth synchro data signals applied to circuit 200.

This motor angular position then is converted to a corresponding voltage through a signal generator circuit 265 which includes a potentiometer P265 having a rotatable center tap from which an azimuth sweep voltage corresponding to the remote azimuth angle may be obtained.

The azimuth sweep signal produced by circuit 265 is applied to a self-balancing deflection amplifier 270 and to an azimuth blanking signal generator 280. While blanking circuit 280 may be of conventional design, circuit 270 is preferably of the self-balancing type. The specific circuit arrangement indicated in circuit 270 is of this self-balancing type.

Finally, circuit 200 includes an azimuth gating signal generator 290 which provides an output signal utilized to control the gating of range marking signals, as will be more fully understood when circuit 300 is considered with reference to FIG. 3*a*. As indicated a simple arrangement is satisfactory where a rotating switch 291 is coupled to the shaft of a remote azimuth scanning device and is adjusted to close a contact 292 at the desired azimuth reference time which may conveniently be at zero azimuth. This switch operation then is utilized in a well-known manner to control the grid bias of a gating stage in circuit 300 to be described.

Referring now to FIG. 3*a*, it is noted that, in a typical form where remote video radar signals are to be compressed, circuit 300 includes a video isolation amplifier 310 which receives remote radar video and trigger signals and produces corresponding amplified output signals which are applied to circuit 315. The output signals produced by circuit 315 are combined in a nonadditive manner in a mixer circuit 320 with range sweep unblanking pedestal signals produced by a range sweep gate circuit 330, and with azimuth-gated range marking signals derived through gating circuit 335.

Range sweep gate 330 also controls a range marking oscillator 340 coupled through an amplifier 345 to a blocking oscillator stage 350. The sharpened range marking signals produced by blocking oscillator 350 are then applied to gating circuit 335 which is operative to pass these signals to mixer circuit 320 upon each occurrence of an azimuth gating signal produced by circuit 290 introduced above. A signal is also obtained from blocking oscillator 350 marking the end of the useful range scanning interval and is amplified through a stage 360 to produce a signal indicated to be a range-gate termination signal. This signal is applied to gate generator 330 to ensure the termination of the range gating signal produced thereby.

The range gating signals are also applied to a range sweep generator 370 which is coupled to a range deflection amplifier 380 indicated again to be of the preferred self-balancing type described in the corresponding abovementioned application by John Daspit.

The output signals provided by mixer stage 320 including amplified remote radar video, trigger signals, range unblanking signals, and azimuth-gated range marks, produced in the manner described above, are applied to a composite video amplifier stage 390 shown in FIG. 3*b*. The output signals produced by circuit 390 are then applied to display device 400CRT to control the corresponding display. In a similar manner the azimuth flyback blanking signal produced by circuit 280 shown in FIG. 2, the range sweep signal produced by circuit 380 of FIG. 3*a*, and the azimuth sweep signal producd by circuit 270 of FIG. 2 are utilized to control display device 400CRT to provide the desired display.

At this point it may be helpful to reconsider the function of the circuits just described with respect to the basic concept of the present invention. While many of the circuits described are conventional circuits which are utilized to provide a linear sweep display in rectangular coordinates, referred to in the art as a "B" display, several important modifications should be noted. It is important to note that trigger signals are amplified along with the remote radar video so that these marks form part of the display allowing an automatic generation of corresponding reference signals, as will be more fully understood when the scanning circuits of FIGS. 4*a* and 4*b* are described below.

Another important modification is the utilization of an azimuth gating signal to control the passage of the range marking signals at a predetermined azimuth reference time. In this manner the desired range marks are available and an azimuth reference signal is conveniently presented so that a separate signal generator and mixer circuit is obviated.

While the utilization of a linear or "B" display is not essential to the invention, such a display is preferred over other displays such as "A," "J," or "PPI" displays, due to the simplicity in display and scanning circuits which are required, as well as the fact that the reference signals are readily encoded without the necessity of complicated circuits. Furthermore, the azimuth resolution at short ranges is better for the "B" display than the "PPI" display. It will be understood, however, that the invention is not limited to the utilization of any particular type of visual display device since it will be apparent that this is only one means of achieving the desired storage and scanning function of circuit 400 to be described.

The remote video-data-representing display provided in the above described manner is coupled through an appropriate optical coupling link to a Vidicon circuit 410 forming part of the scanning arrangement of circuit 400 shown in FIGS. 4*a* and 4*b*. Circuit 410 is considered as including several subcomponents designated as circuits 410–1, 410–2, 410–3, and 410–4.

Circuit 410–1 includes a Vidicon tube 411–1 which may be of the type described in an article entitled "The Vidicon Photoconductive Camera Tube" by D. J. Weimer et al. in volume 23 of Electronics on page 70, May 1950. It will be noted that circuit 410–1 includes suitable bias and potential supplying elements as are required for the proper operation of the Vidicon. While these circuits are conventional, it is important to note that a target voltage of approximately +10 volts is utilized which is lower than conventional practice. This lowered potential allows a longer decay time for storage, as is required in practicing the invention. It has been found with the specific circuit arrangement indicated in FIG. 4*a* that a storage time in excess of 10 seconds may be expected. Thus no difficulty is obtained in utilizing an azimuth cycle rate of 10 seconds as will be explained below.

Circuit 410 also includes a preamplifier 410–2, a narrow band output amplifier 410–3, and a clamping circuit 410–4 for amplifying and eliminating noise from the compressed video signals.

The scanning operation of Vidicon circuit 410–1 is controlled by range and azimuth deflection amplifier circuits 431 and 432 forming the means of sweep control circuit 430 of FIG. 1, which are coupled respectively to the range and azimuth yokes 411R and 411A controlling the sweep of the Vidicon beam in tube 411–1. Deflection circuits 431 and 432 are actuated respectively by range and azimuth sweep generator circuits 451 and 471, shown in FIGS. 4*a* and 4*b*, respectively.

Range gating signals suitable for driving sweep generator 451 may be obtained by utilizing local 60-cycle power to drive a squaring amplifier 453, shown in FIG. 4*b*, providing a squarewave signal which may then be frequency divided to the desired range sweep rate. In the arrangement of FIG. 4*b* a frequency divider 455 is shown which essentially is a free-running multivibrator which is synchronized by the signals received from circuit 453 at a submultiple frequency specifically selected to be 20 cycles per second. Circuits 451, 453 and 455 thus form range sweep generator 450 of FIG. 1.

It is important to note at this point that the range gating signals need not be synchronized in any way with the actual remote trigger signals since the Vidicon scanning operation will automatically generate such trigger signals as the Vidicon beam scans the corresponding marks on the optical display provided by tube 400CRT. Thus the 60-cycle source is not by any means a synchronizing source but simply a convenient input signal. In a similar manner azimuth sweep generator 471 may be driven by a 60-cycle per second synchronous motor 473 which is not in any way synchronized with scanning operation of the remote video data providing means; devices 471 and 473 forming the azimuth sweep generator of FIG. 1.

It is important, however, that a fixed ratio be maintained between the range sweep rate and the azimuth sweep rate in order to allow proper decoding and display where the encoded signals are utilized. The reason for this is more fully pointed out in the abovementioned copending application by John Daspit where the assembly system is described.

Range gate generator 455 and azimuth sweep generator 471 are also coupled to a mixer and blanking signal generator stage 435, shown in FIG. 4*b*. This stage generates a flyback blanking signal which is mixed with the output signals produced by preamplifier 410–2 shown in FIG. 4*a* and applied to circuit 410–3. The technique which is utilized to form the blanking signal is conventional and therefore will not be described in further detail.

As in the case of the specific circuits illustrated as suitable for translation means 100, the specific circuit arrangement illustrated as suitable for circuit 400 may consist mainly of conventional circuits except for a few important modifications which must be introduced for the purposes of the invention. It is important that the Vidicon operating characteristics be selected to ensure that the storage of the display charge pattern be maintained for an interval which is equal to or greater than the azimuth scanning cycle rate illustrated specifically to be 10 seconds.

Furthermore, it is important to note the simplicity of the range gating circuit and the azimuth sweep generator circuit where it is not necessary to synchronize these circuits with trigger signals or azimuth synchro data. In addition, it is important to bear in mind that the Vidicon circuit continuously detects reference signals which have been displayed, obviating the necessity of separately generating and then mixing such signals with the compressed video signals which result.

The compressed video signals formed in this manner are then applied to output circuit 500 shown in specific illustrative detail in FIG. 5. As indicated in FIG. 5 the compressed video data signals are applied to a clamping circuit 510 which is designed to eliminate undesired noise. The output signal provided by circuit 510 is applied to an amplifier stage 520 driving a low-pass filter 530 coupled to one input circuit of a doubly balanced modulator circuit 540. It will be noted that the signal provided by filter 530 is designated as a signal V indicating that it is compressed video. Modulator 540 also receives a carrier signal C provided by a carrier oscillator circuit 550. The carrier frequency is selected in accordance with the transmission facilities available, a typical frequency being 1600 c.p.s. for transmission through telephone facilities. The output signal of the carrier oscillator is designated as signal C, the symbols C and V being utilized below to explain the operation of modulator 540.

In brief, modulator 540 forms pure side band modulation according to the function $(C+V)^2-(C-V)^2=4CV$. This operation is achieved by phase splitting the carrier signal C through a stage 541 to provide signals −C and +C. The signal −C is combined with signal V and then squared through a balanced-squaring stage 542 to provide the output signal $(C-V)^2$. In a similar manner the signal +C is combined with the signal V and is squared to form the signal $(C+V)^2$ in a balanced squaring stage 543. The signal $(C-V)^2$ is inverted in a stage 544 to produce the signal $-(C-V)^2$ combined with the signal $(C+V)^2$ in an adder stage 545 to produce a signal 4CV containing essentially only side bands.

The lower side band of signal 4CV and a vestige of the upper wise band is then separated out through a low pass filter stage 560, the output signal of which is mixed with the carrier signal C in a carrier-side band mixer circuit 570. The output signal produced by circuit 570 then contains the desired amount of carrier and side band signals. The signal produced by circuit 570 is applied to a line driver circuit 580 which is indicated to include a switch 581 for selecting between the carrier mode signal produced by circuit 570 and the raw video signal which is available directly from amplifier 520. It will be understood, however, that it is not essential that the choice between two modes of operation be available since it is contemplated by the invention that either mode may be utilized. Furthermore, it will be understood that the particular output circuit arrangement of FIG. 5 is merely illustrative of a preferred circuit for driving a low band pass telephone line.

From the foregoing description it is apparent that the present invention provides a circuit and a method for encoding video data in a manner allowing transmission thereof over narrow bandwidth facilities where no electronic or mechanical synchronism is required between the means providing the remote video data and the encoding circuit.

What is claimed is:

1. In radar apparatus, the combination comprising: a cathode-ray tube having a luminescent screen; an antenna; first means for pulsing said antenna to cause it to radiate a burst of energy; second means operable in synchronism with said first means to gate the cathode-ray of said cathode-ray tube on in a manner to produce a plurality of marks on said screen spaced apart distances representing invariant intervals of time; third means to deflect the cathode ray of said cathode-ray tube at a predetermined scan rate; and a camera positioned and connected to scan said cathode-ray tube at a rate slower than the scan rate of said cathode-ray tube.

2. In radar apparatus, the combination comprising a cathode-ray tube having a luminescent screen; an antenna; first means for pulsing said antenna to cause it to radiate a burst of energy; second means operable in synchronism with said first means to gate the cathode ray of said cathode-ray tube on in a manner to produce a plurality of marks on said screen spaced apart distances representing invariant intervals of time; third means to deflect the cathode ray of said cathode-ray tube at a predetermined scan rate; and a camera including a Vidicon tube positioned and connected to scan said cathode tube at a rate slower than the scan rate of said cathode-ray tube.

3. In radar apparatus, the combination comprising: a cathode-ray tube having a luminescent screen; an antenna; first means for rotating said antenna about a predetermined axis; second means responsive to rotation of said antenna and operable in synchronism with said first means to gate the cathode ray of said tube on in a manner to produce a plurality of marks on said screen spaced apart distances representing invariant ranges of the angular position of said antenna; third means to deflect the cathode ray of said cathode-ray tube at a predetermined scan rate; and a camera positioned and connected to scan said cathode-ray tube at a rate slower than the scan rate of said cathode-ray tube.

4. In radar apparatus, the combination comprising: a cathode-ray tube having a luminescent screen; an antenna; first means for rotating said antenna about a predetermined axis; second means responsive to rotation of said antenna and operable in synchronism with said first means to gate the cathode ray of said tube on in a manner to produce a plurality of marks on said screen spaced apart distances representing invariant ranges of the angular position of said antenna; third means to deflect the cathode ray of said cathode-ray tube at a predetermined scan rate; and a camera including a Vidicon tube positioned and connected to scan said cathode tube at a rate slower than the scan rate of said cathode-ray tube.

References Cited in the file of this patent

UNITED STATES PATENTS

| | | |
|---|---|---|
| 2,219,021 | Reisz | Oct. 22, 1940 |
| 2,412,670 | Epstein | Dec. 17, 1946 |
| 2,415,981 | Wolff | Feb. 18, 1947 |
| 2,422,295 | Eaton | June 17, 1947 |
| 2,430,283 | Epstein | Nov. 4, 1947 |
| 2,454,652 | Iams et al. | Nov. 23, 1948 |
| 2,524,295 | Mesner | Oct. 3, 1950 |
| 2,528,202 | Wolff | Oct. 31, 1950 |
| 2,595,691 | Morton | May 6, 1952 |
| 2,753,552 | Ham | July 3, 1956 |
| 2,861,263 | McLucas | Nov. 18, 1958 |

FOREIGN PATENTS

| | | |
|---|---|---|
| 729,055 | Great Britain | May 5, 1955 |